May 10, 1966 H. L. WILLIAMS 3,250,510
SELF-ADJUSTABLE SEATS FOR BUTTERFLY VALVES OR THE LIKE
Filed Feb. 18, 1964 2 Sheets-Sheet 1
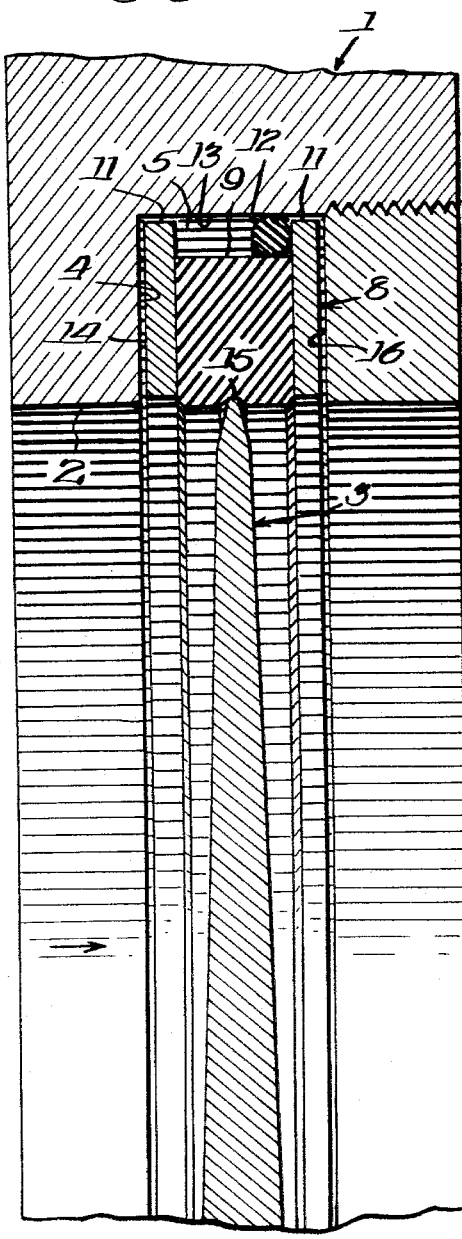
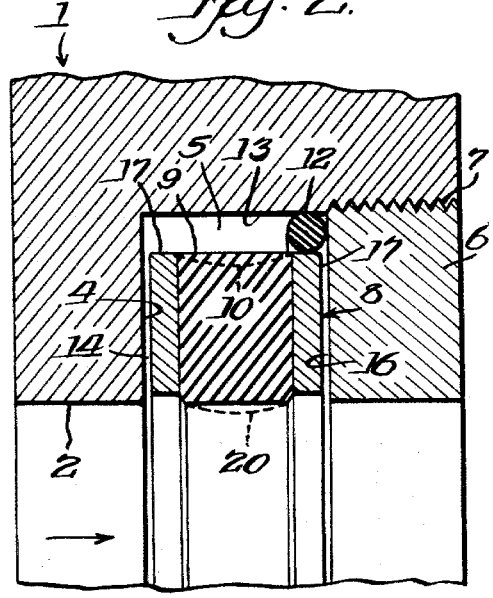
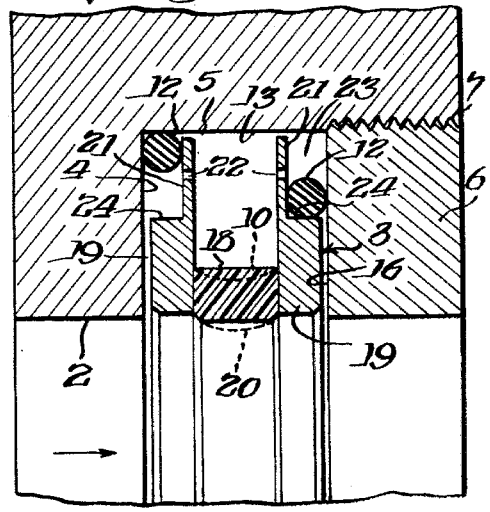
Inventor:
Hubert L. Williams.
By Joseph O. Lange Atty.

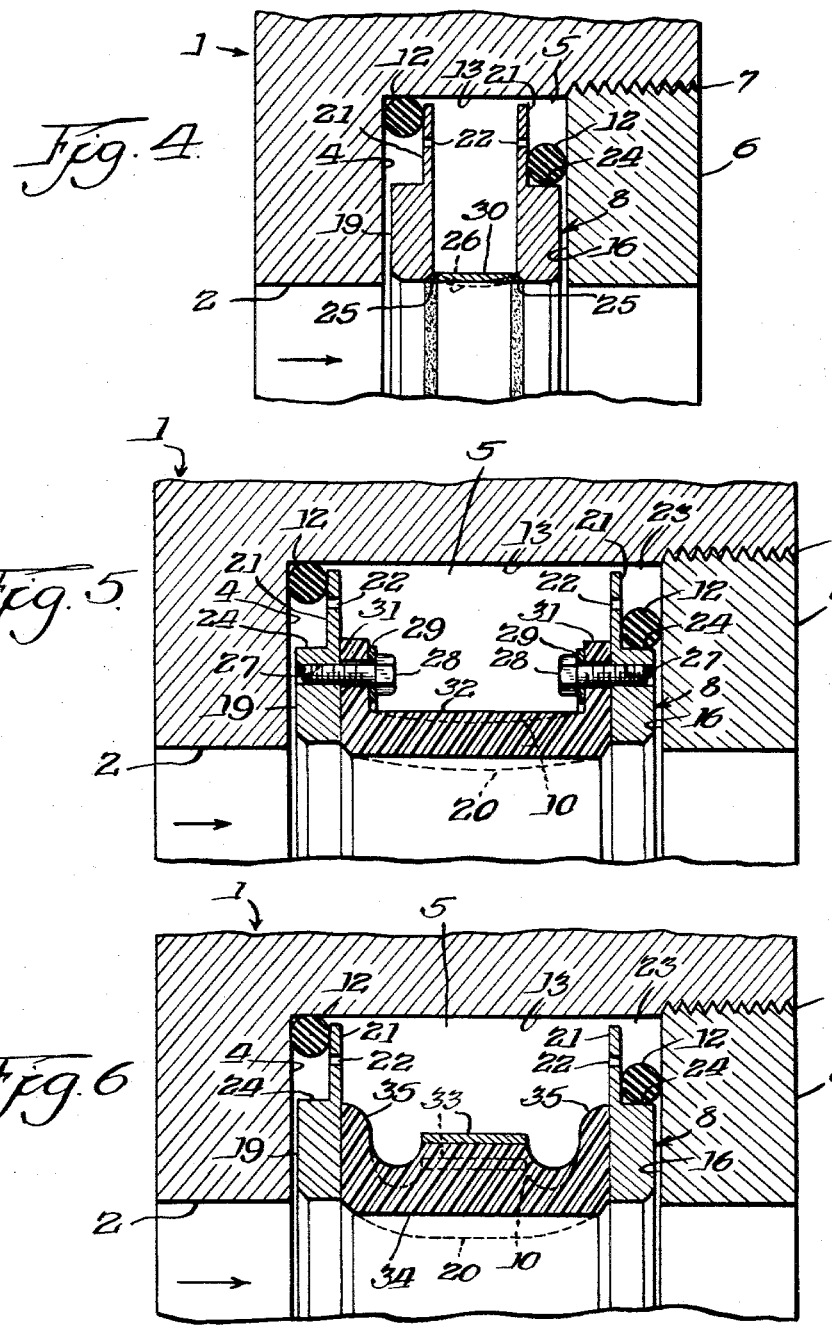

United States Patent Office 3,250,510
Patented May 10, 1966

3,250,510
SELF-ADJUSTABLE SEATS FOR BUTTERFLY
VALVES OR THE LIKE
Hubert L. Williams, Hinsdale, Ill., assignor to Crane Co.,
Chicago, Ill., a corporation of Illinois
Filed Feb. 18, 1964, Ser. No. 345,765
11 Claims. (Cl. 251—173)

This invention relates generally to a valve seat and more particularly it is concerned with a flexible and self-adjustable valve seat specially useful for butterfly valves.

The invention constitutes an improvement over the butterfly valve construction shown in U.S. Patent No. 2,911,184 and British Patent No. 927,502.

At the outset, in order to have a better understanding of the merits of this invention, it should be understood that when it becomes necessary to provide valve seats and sealing means therefor in relatively large valves, such as of the order of 24" or 36" pipe sizes and larger, an unusual problem is encountered because of the necessity for effectively sealing the periphery of the butterfly valve closure member, while at the same time enhancing such seal by utilizing the line fluid pressure. Such arrangement is desirable because of the greater weight of the valve parts being actuated and also because of the increased difficulty in obtaining satisfactory dimensional tolerances.

Also of significance in this invention, is the necessity for providing a seat and seal of the character hereinafter described in which the manufacturing costs of producing the valves are substantially reduced due to said allowance for greater dimensional tolerances between the peripheral edge of the valve closure member and the casing flow bore in which the latter member is located.

Another object of this invention is to provide for a valve seat and seal in which frictional losses normally tending to impede the free movement of the valve closure member with which it is associated are materially reduced and thus corresponding reductions in wear on both the valve member and the seal are obtained. Obviously, this aids materially in prolonging the useful life of the valve in which the seal and the valve member are incorporated and also results in greater efficiency in the performance of the valve during service.

Another object is to provide for a pressure loaded dynamic seal for use in conjunction with a butterfly valve member, for example, which is energized by pressure differentials created in the valve flow passage when the butterfly valve is moved into closed position. This provision allows for the sealing member to be self-centered and most effectively urged into sealing engagement with the peripheral edge of the butterfly closure member.

This invention further provides for the sealing member to be most effectively urged into sealing engagement with the peripheral edge of the butterfly closure member when the valve is closed. More specifically, as will hereinafter be explained, a predetermined amount of radial movement of the sealing element occurs in a direction toward the periphery of the closure member to produce the desirable function above referred to.

It will also be appreciated that conversely when the butterfly valve closure member is rotated to its open position and the pressure differential across the closure member is substantially reduced, the fluid sealing pressure exerted by the seal means of my invention against the peripheral edge of the valve closure member is correspondingly reduced, thereby to permit relatively freer movement of the valve closure member and to reduce the frictional losses and the drag characteristics of prior seat constructions. Thus, the valve is easier to operate.

Or in other words, the self pressure sealing of the valve reduces the torque requirements of the operator employed. The valve at low pressure will seat with a lower torque than the same valve at higher pressure. This reduces the general operator costs.

It should also be understood that the seat contours can be varied as required to suit various stem mountings such as offset stem or a perpendicular stem.

In summary, a versatile, less costly, and more effective sealing means is provided with substantial benefits such as freedom of movement in both radial and axial directions.

A still further object lies in providing for a valve sealing means for butterfly valve members and the like in which a variety of sealing means may be used. These include metals, elastomers, or suitable plastics, such as tetrafluoroethylene, which are characterized by outstanding chemical resistance, excellent heat stability and low coefficients of friction, either alone, or in combination with metals.

Another important object is to provide for a resilient seat construction in which the elastomer or other material is bonded to a portion of the seat, attached by mechanical means, or welded. The deflection provided, as hereinafter explained, may be either in shear or otherwise suitably formed under the influence of line fluid pressure to provide an improved seat seal.

Other objects and advantages of my invention will become more apparent upon proceeding with the following description read in light of the accompanying drawings, in which:

FIG. 1 is a fragmentary sectional assembly view of one form of my invention;

FIGS. 2 to 6 inclusive show other modified forms of the invention.

Similar reference numerals refer to similar parts throughout the several views.

Referring now to FIG. 1 and as shown in fragmentary section, a butterfly valve body or casing generally designated 1 is illustrated. For the purpose of receiving a valve closure member generally designated 3, the said body is provided with a through port 2 within which said closure member is pivotally mounted about an axis of rotation (not shown) extending transversely across said passage. By the term transversely is meant to imply angle type of stem installations as well as offset stems.

Mention is made here that the disc or closure member 3, shown only in FIG. 1, is suitable for use with the construction of the other figures as hereinafter described and is therefore omitted therefrom. The port 2 of the valve casing 1 is provided with an annular transverse surface 4 defining, as hereinafter explained, an annular recess 5, the opposite end limit of said recess being defined by a threaded ring 6 threadedly attached to the body 1 as at 7, thereby to permit convenient inspection, assembly, and servicing of the resilient valve seat member generally designated 8.

The valve seat member 8 in the instant embodiment of FIG. 1 is provided with an annular disposed resilient ring member 9 which may be an elastomer or other suitable resilient material, the outer end limits of the said elastomer ring being sandwiched between and bonded to the respective inner surfaces of the end disposed plate-like ring members 11. Preferably, the latter members are of a diameter sufficient to be relatively loosely received on their peripheries within the recess 5 as shown. The difference in the outside diameter of the elastomer ring member 9 and that of the plate-like members 11 is of such proportions as to receive the O-ring 12, which is of a slightly larger cross-section than the space measured by the width of the recess 5 as defined by the outside diameter of the elastomer ring 9 and the inside diameter 13 of the recess 5. The purpose of the O-ring 12 is to serve as a sealing medium between an end portion of the recess 5 as defined by one of the plate-like ring members 11, the inside diameter 13 of the recess 5 and the outside diameter of the resilient ring member 9. Said arrangement permits of a predetermined axial movement of the O-ring between the plate-like ring members 11. The direction of such axial movement of the O-ring depends upon the fluid flow in relation to the valve.

It should therefore be understood that the dimensions of the valve seat member 8, particularly with respect to the ring members 11 and with relation to the thickness of the elastomer member 9 are such as to provide a freedom of axial movement of the seat member 8 within the recess 5, depending upon the direction of fluid flow relative to the valve casing 1. Specifically, if the fluid pressure is in a direction as indicated by the arrow in the port 2 of the valve, and assuming that the latter is closed as shown in FIG. 1, fluid flow will enter between the surfaces 4 and 14, then pass around the outer peripheral surface of the member 11 into the recess 5, causing the O-ring sealing member 12 to assume the sealing position as shown. The occurrence of such O-ring positioning thereby traps the line fluid within the recess 5 and creates a pressure condition applied around the outer periphery of the elastomer ring member 9. The latter member is then deflected radially inward in a direction toward the outer periphery 15 of the valve closure member 3 to a sufficient degree as to cause an annular impingement or interference fit at 15 as shown in the drawing.

Thus under the influence of line fluid pressure and before actual radial deflection inwardly of the ring member 9 takes place, the seat 8 will have moved predeterminately downstream to shoulder against the annular surface 16 before the interference fit is completed between the closure member 3 and the ring member 9 as indicated at 15. As previously referred to, the said ring member is bonded to the plate-like ring members 11.

It will be appreciated that the final seating of the valve takes place only after the axial movement of the seat 8 as above described has occurred.

Referring now to the modified construction of FIG. 2, the seat member 8 is substantially the same general construction as that described in FIG. 1, except that the plate-like ring members 17 are, as indicated, of a substantially smaller diameter than the ring members 11 shown in FIG. 1. Accordingly, the members 17 do not fill the annular space defined by 13. In this construction, the O-ring member 12 under the influence of line fluid pressure as previously described in connection with FIG. 1 will move axially along and around the outer periphery of the plate-like ring member 17 at the downstream end of the recess 5 as illustrated.

It will also be understood that under the influence of line fluid flow entering from the port 2, with the direction of flow as indicated by the arrow therein, the ring member 9 will be deflected radially inwardly as indicated by the dotted lines at 10 and 20 to create the interference fit between the closure member 3 and the elastomer ring member 9 as illustrated in FIG. 1. Actually, it will be further appreciated that while the ring member 9 is preferably bonded to the plate-like ring members 17 as described in connection with FIG. 1, the line fluid pressure applied inwardly against the outer peripheral surface of the ring member 9 will place the material of the latter member in shear under the influence of such line fluid pressure.

Referring now to a further modified form shown in FIG. 3, in place of the elastomer ring members 9 described in connection with FIGS. 1 and 2, a plastic ring member 18 interposed between and bonded to the plate-like ring members 19 is of a reduced diameter than that previously described. As shown in this modification, the plate-like ring members 19 are substantially larger in diameter than the plastic ring 18 and are annularly shouldered as at 21. Also, said members 19 are suitably apertured as at 22 to allow for the passage of fluid flow between the members 19 and communicating with the surrounding limits defining the recess 5. The annular reduced or shoulder portion 21 with relation to the surfaces 4 and 16 is of a sufficient depth to permit receiving relatively snugly the O-ring members 12 as indicated. The said reduced or shoulder portion 21 extends inwardly to the thickened portion of the members 19 as defined at 24. Thus, with the line fluid flow through the valve and with the closure member in closed position as shown in FIG. 1, line fluid flow will enter around the annular surface 21 thereby to force the first O-ring 12 radially outwardly to bear against the annular surface 4, the peripheral surface 13 and the reduced portion 21. In this construction, the effect of the entry of the line fluid pressure in the manner described causes the seat member 8 to be moved axially downstream and to abut the surface 16 thereby causing line fluid pressure to pass through the apertures 22 and enter the downstream portion 23 of the recess 5 to cause the second O-ring member 12 (at the right) to bear against the surfaces 16, 21, and 24 to complete the formation of a fluid tight recess 5. The construction herein described provides for a self-centering seat unit due to the use of the two spaced-apart O-ring seals 12. Further, it permits of the convenient use of other plastics such as previously mentioned, tetrafluoroethylene and the like.

Referring now to a further modification as shown in FIG. 4, the plastic member 18 shown in FIG. 3 is omitted in the instant construction. Between the plate-like ring members 19, a suitable annular member such as the short tubular relatively thin strip of metal designated 24 is annularly attached as at 25 by means of welding, brazing, or soldering to the said members 19. Here, as described in connection with the previous figures, line fluid passing over the surface 4 and entering the chamber 5 causes the O-ring member 12 to contact the peripheral surface 13 in the manner illustrated. At the same time, the line fluid pressure moving into the chamber 5 exerts fluid pressure against the outer surface of thin tubular member 30 to cause the latter member to assume the inwardly convex position indicated at 26 by dotted lines. It will be clear that by reason of such deflection of said tubular member, the desired peripheral seat contact for the closure member 3 shown in FIG. 1 is obtained. The tubular member 30 may of course be made of any suitable material and by any convenient means, as, for example, a section of relatively thin tubing may be employed. Otherwise, it may be extruded from a separate material drawn down to a suitable size depending upon the character of the service encountered in the field.

In considering a further modification as shown in FIG. 5, it should be understood at the outset that for certain types of valves for various services it may be desirable to employ an interposed molded polyfluorethylene polymer member which may be mechanically connected to the plate-like members 19 which are annularly reduced or shouldered as at 21. The members 19 are provided with the annularly disposed spaced-apart tapped holes 27 to receive the retaining bolts or cap-screws 28, the latter members engaging the ring members 29 which bear against the flange portions 31 of the molded seat member or ring 32. In all other respects, this modified construction follows the general arrangement shown and described in connection with FIG. 3. The bolts 28 thus serve as the means for connecting the plastic seat member 32 at its flanged portions 31. It will be understood that this connection means is a substitute or alternate for that attaching means described previously. In this modified form under the influence of line fluid pressure performing in the same manner as described for the FIGS. 3 and 4, the seat member 32 will be deflected radially inwardly as indicated by the dotted lines 10 and 20. The modified construction immediately described above permits the use of special plastics in which the attachment thereof does not necessarily require bonding or which do not lend themselves readily to bonding.

A still further modified form of construction within the scope of this invention is shown in FIG. 6, in which a further advantage of the deflectable plastic seat member 32 as indicated at 10 and 20 in the previous figures is obtained. Specifically, this is accomplished by means of an annular stiffening member, such as the short length of tubing or reinforcing ring-like member designated 33. In this construction, the modified plastic seat member 34 is preferably formed with the annular flanges 35. The latter arrangement provides a desirable area for effecting the bonding connection to the plate-like annular members 19. In this construction, and again assuming that line fluid flow occurs in the same manner from a source indicated by the arrow in the valve port, said pressure enters the chamber 5 exerting pressure against the outer periphery of the short length of tubing 33, causing the latter member to assume the position indicated by the dotted lines 10 and 20, with the reinforcing member also being shown in dotted lines in the deflected position. The said deflection of the seat member 34 follows the general pattern indicated. In all other respects, the seat construction in its arrangement and functioning will perform in generally the same manner as described for the other figures in creating an inteference fit between the outer periphery of the closure member 3 (not shown), and the modified seat member 34. It also prevents objectionable bulging or arching of the seat under severe service conditions.

It should be appreciated that while a plurality of embodiments has been shown and described, the invention is capable of other applications not specifically described or illustrated and therefore the scope of the invention should be measured by the appended claims.

I claim:

1. The combination in a valve, a valve body having a flow passage therethrough and an annular recess in the wall of said flow passage, a butterfly closure member pivotably movable in the valve body with its axis of rotation intersecting the longitudinal axis of said flow passage in which the peripheral edge of said closure member overlies said body annular recess, a resilient seat member mounted in said body recess so as to be capable of axial and radial movements to accommodate itself as an interference fit for the periphery of said closure member with the latter member in its closed position thereby to seal said flow passage, the said seat member comprising oppositely disposed plate-like ring members and a resilient ring member therebetween positioned in fluid sealing relation thereto, said resilient ring member being deflectable radially inwardly under predetermined line fluid pressure to effect said interference fit relative to the periphery of said closure member and said resilient member, and fluid sealing means between said seat member and said wall recess.

2. The combination in a valve, a valve body having a flow passage therethrough and an annular recess in the wall of said flow passage, a butterfly closure member pivotably movable in the valve body with its axis of rotation intersecting the longitudinal axis of said flow passage in which the peripheral edge of said closure member overlies said body recess, a resilient seat member mounted in said body recess in spaced apart relation thereto so as to be capable of predetermined axial and radial movements to accommodate itself as an interference fit for the periphery of said closure member with the latter member in its closed position thereby to seal said flow passage, the said seat member comprising oppositely disposed plate-like ring members and a resilient ring member therebetween positioned in fluid sealing relation thereto, said resilient ring member therebetween positioned in fluid sealing relation thereto, said resilient ring member being deflectable radially inwardly under predetermined line fluid pressure to effect said interference fit relative to the periphery of said closure member and said resilient member, and fluid sealing means substantially cooperating with the spaced-apart portions lying between said seat member and said wall recess.

3. The combination in a valve, a valve body having a flow passage therethrough and an annular recess in the wall of said flow passage, a butterfly closure member pivotably movable in the valve body with its axis of rotation intersecting the longitudinal axis of said flow passage in which the peripheral edge of said closure member overlies said body recess, a resilient seat member mounted in said body recess so as to be capable of axial and radial movements to accommodate itself as an interference fit for the periphery of said closure member with the latter member in its closed position thereby to seal said flow passage, the said seat member comprising oppositely disposed plate-like ring members and a resilient ring member therebetween positioned in fluid sealing relation thereto, said resilient ring member being deflectable radially inwardly under predetermined line fluid pressure to effect said interference fit relative to the periphery of said closure member and said resilient member, and fluid sealing O-ring means movable between said seat member and said wall recess in response to line fluid pressure.

4. The subject matter of claim 2, the said fluid sealing means comprising pressure responsive O-rings movable between said plate-like ring members to predeterminately seal said spaced apart portions between said seat member and said wall recess, the said plate-like ring members being spaced apart to substantially define opposite end limits of said body recess.

5. The subject matter of claim 4, said spaced apart plate-like ring members being of a reduced diameter to permit movement of said pressure responsive O-rings between end limits of said body recess.

6. The subject matter of claim 3, the said plate-like ring members having annular shoulders for mounting said O-rings in predetermined fluid sealing relation between said shoulders and a peripheral portion of said recess.

7. The subject matter of claim 3, the said resilient ring member comprising a short length of relatively thin tubing.

8. The subject matter of claim 3, the said resilient ring member being substantially of U-form when viewed in cross-section, the legs of said U-form being attached to said plate-like ring members in fluid sealing relation thereto.

9. The subject matter of claim 8, the said attachment means comprising a plurality of bolts annularly disposed in spaced apart relation engaging the said plate-like ring members.

10. The subject matter of claim 8, the portion of said U-form connecting said legs being reinforced.

11. The subject matter of claim 10, said reinforcing means comprising a substantially tubular member connected to said U-form.

No references cited.

MARTIN P. SCHWADRON, *Primary Examiner.*

H. WEAKLEY, *Examiner.*